US012782153B2

(12) United States Patent
Goenawan et al.

(10) Patent No.: US 12,782,153 B2
(45) Date of Patent: Nov. 3, 2026

(54) PROACTIVELY ACTIVATING AUTOMATED ASSISTANT DRIVING MODES FOR VARYING DEGREES OF TRAVEL DETECTION CONFIDENCE

(71) Applicant: Google LLC, Mountain View, CA (US)

(72) Inventors: Effie Goenawan, San Francisco, CA (US); David Robishaw, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 219 days.

(21) Appl. No.: 17/533,380

(22) Filed: Nov. 23, 2021

(65) Prior Publication Data

US 2023/0062489 A1 Mar. 2, 2023

Related U.S. Application Data

(60) Provisional application No. 63/236,584, filed on Aug. 24, 2021.

(51) Int. Cl.
*G01C 21/36* (2006.01)

(52) U.S. Cl.
CPC ..... *G01C 21/3635* (2013.01); *G01C 21/3641* (2013.01); *G01C 21/3667* (2013.01)

(58) Field of Classification Search
CPC ............ G01C 21/3635; G01C 21/3641; G01C 21/3667

(Continued)

(56) References Cited

U.S. PATENT DOCUMENTS 9,264,862 B2 * 2/2016 Tu .......................... H04W 4/029
9,891,068 B2 * 2/2018 Vulcano ............... G01C 21/362

(Continued)

FOREIGN PATENT DOCUMENTS

CN 110332944 10/2019
CN 111348055 6/2020

(Continued)

OTHER PUBLICATIONS

European Patent Office; International Search Report and Written Opinion issued in Application No. PCT/US2021/061237; 14 pages; dated May 27, 2022.

(Continued)

*Primary Examiner* — Kyle J Kingsland
*Assistant Examiner* — Merritt Levy
(74) *Attorney, Agent, or Firm* — Gray Ice Higdon

(57) ABSTRACT

Implementations set forth herein relate to an automated assistant that can operate according various driving-optimized modes depending on a degree of confidence that a user is predicted to be traveling in a vehicle. For instance, the automated assistant can automatically operate according to a driving-optimized mode when a prediction that the user is traveling corresponds to a certain degree of confidence. Alternatively, when a prediction that a user is traveling corresponds to lesser degree of confidence, the automated assistant may not operate according to the driving-optimized mode until the user expressly selects to transition the automated assistant into the driving-optimized mode. When the user selects the driving-optimized mode, a driving mode GUI can be rendered with a navigation interface that may include directions to a predicted destination of the user and/or another interface with content suggestions for the user.

9 Claims, 7 Drawing Sheets

(58) Field of Classification Search
USPC .......................................................... 701/533
See application file for complete search history.

(56) References Cited

U.S. PATENT DOCUMENTS

| | | | | |
|---|---|---|---|---|
| 9,924,017 | B2* | 3/2018 | Dickow | H04M 1/724098 |
| 9,965,035 | B2* | 5/2018 | Santamaria | H04L 67/1095 |
| 2009/0140845 | A1* | 6/2009 | Hioki | G02B 27/01 340/425.5 |
| 2011/0275358 | A1* | 11/2011 | Faenger | H04W 8/24 455/420 |
| 2012/0035924 | A1 | 2/2012 | Jitkoff et al. | |
| 2012/0289244 | A1* | 11/2012 | Goyal | G01S 19/34 455/456.1 |
| 2013/0275875 | A1 | 10/2013 | Gruber et al. | |
| 2013/0322634 | A1* | 12/2013 | Bennett | H04R 5/04 704/274 |
| 2013/0344859 | A1* | 12/2013 | Abramson | H04M 1/724098 455/418 |
| 2014/0136013 | A1 | 5/2014 | Wolverton et al. | |
| 2014/0310739 | A1* | 10/2014 | Ricci | G06Q 20/321 725/75 |
| 2014/0365124 | A1 | 12/2014 | Vulcano | |
| 2015/0087264 | A1* | 3/2015 | Goyal | H04W 4/027 455/411 |
| 2015/0168174 | A1* | 6/2015 | Abramson | G01C 21/3407 701/408 |
| 2016/0036964 | A1* | 2/2016 | Barfield, Jr. | H04W 4/029 455/418 |
| 2016/0054137 | A1* | 2/2016 | Wheatman | G01C 21/36 701/425 |
| 2016/0150020 | A1 | 5/2016 | Farmer et al. | |
| 2016/0231743 | A1* | 8/2016 | Bendewald | B60W 60/0051 |
| 2016/0266872 | A1 | 9/2016 | Jeon et al. | |
| 2017/0215031 | A1* | 7/2017 | Harding | G01C 21/3667 |
| 2018/0299289 | A1* | 10/2018 | Hill | H04W 4/48 |
| 2018/0307504 | A1* | 10/2018 | Aggarwal | G06F 3/167 |
| 2019/0316916 | A1* | 10/2019 | Perry | G01C 21/3608 |
| 2019/0369748 | A1* | 12/2019 | Hindi | G06F 3/016 |
| 2019/0369868 | A1 | 12/2019 | Tang et al. | |
| 2019/0383631 | A1* | 12/2019 | Bigio | G06V 20/59 |
| 2020/0075002 | A1 | 3/2020 | Pufahl et al. | |
| 2020/0356339 | A1 | 11/2020 | Krishnan et al. | |
| 2021/0048944 | A1 | 2/2021 | Chandrababu et al. | |
| 2021/0278233 | A1* | 9/2021 | Basir | H04M 1/6091 |

FOREIGN PATENT DOCUMENTS

| | | | | |
|---|---|---|---|---|
| CN | 113226886 | | 8/2021 | |
| EP | 2778614 | A1 * | 9/2014 | G01C 21/36 |
| WO | WO-2008077069 | A1 * | 6/2008 | G01C 21/36 |
| WO | 2020176111 | | 9/2020 | |

OTHER PUBLICATIONS

European Patent Office, Intention to Grant issued in Application No. 21835480.1; 45 pages; dated Feb. 20, 2024.

Korean Patent Office, Office Action issue in Application No. 10-2023-7036509, 18 pages, dated Sep. 5, 2025.

European Patent Office, Intention to Grant issued in Application No. 24188018.6; 41 pages; dated Jul. 17, 2025.

Intellectual Property India, Hearing Notice issued in Application No. 202327061293, 4 pages, dated Mar. 18, 2026.

Chinese Patent Office, Office Action issued in Application No. 202180096633.5, 10 pages, dated May 15, 2026.

Intellectual Property India, Examination Report issued in Application No. 202327061293, 7 pages, dated Jun. 6, 2025.

European Patent Office, Communication issued in Application No. 24188018.6; 6 pages; dated Sep. 16, 2024.

* cited by examiner

PROACTIVELY ACTIVATING AUTOMATED ASSISTANT DRIVING MODES FOR VARYING DEGREES OF TRAVEL DETECTION CONFIDENCE

BACKGROUND

Humans can engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed, and/or by providing textual (e.g., typed) natural language input.

Automated assistants and other applications can be accessed through portable computing devices, such as cellular phones and tablet computers, in a variety of contexts, such as when a user is traveling in a vehicle. When a driving mode is offered by a particular application (e.g., an automated assistant application), a user may be required to directly initialize the driving mode via an input to their computing device. However, this may not be convenient or safe when the user is already driving their vehicle. For instance, a user that is driving their vehicle may desire to access their automated assistant while simultaneously receiving navigation instructions from a navigation application. Unfortunately, many automated assistants may not be responsive to requests during navigation without interrupting the rendering of navigation instructions. Interrupting navigation in this way can prove hazardous for the user, as the user attempts to further their interaction with the automated assistant and/or identify any navigation instructions that the user may have missed. Furthermore, assistant responses during driving and/or navigation may prove distracting when the automated assistant is not aware that the user is driving.

SUMMARY

Implementations set forth herein relate to an automated assistant that proactively determines whether a user is traveling in a vehicle and, thereafter, provides driving-optimized assistant responses accordingly. In some implementations, the user can be driving their vehicle and submit a query to an automated assistant that is accessible via a cell phone of the user. Prior to the user providing the query, the automated assistant can proactively detect that the user is traveling in a vehicle. Therefore, in response to the query from the user, the automated assistant can generate a response in dependence on the determined context of the user driving their vehicle. For example, when the query is a spoken utterance, such as, "Assistant, Acme Consignment," the automated assistant can respond with navigation instructions to the nearest store named "Acme Consignment." The automated assistant may therefore take into account that the user is likely travelling in a vehicle and/or is in a driving mode, when generating a response to the query. For example, if the user realizes they do not know the exact directions to "Acme Consignment," despite traveling towards a general vicinity of the store, the user can provide the aforementioned query to cause the automated assistant to provide detailed navigation instructions along the way. On the other hand, when the user provides this query while the user is no longer driving, the automated assistant may provide internet search results for "Acme Consignment," which can include a link to a website for "Acme Consignment."

Put another way, implementations disclosed herein can, in response to determining a user is likely driving and/or in response to a user device being in a driving mode, bias natural language understanding and/or fulfillment, that is performed based on user requests, towards intent(s) and/or fulfillment(s) that are safer and/or more conducive to driving. For example, biasing toward a "navigation" intent when in the driving mode can result in a navigation intent being determined for the "Assistant, Acme Consignment" user request above (and navigation instructions being provided responsive to the request), while not biasing toward that navigation intent (e.g., when not in the driving mode) can result in a general search intent being determined for the "Assistant, Acme Consignment" user request above (and general information about "Acme Consignment" provided responsive to the request). Accordingly, in these and other manners automated assistant responses to requests can be dynamically adapted in dependence on whether the requests are initiated from a user device that is in a driving mode and/or from a user device that is detected to be travelling in a vehicle.

In some implementations, the automated assistant can detect when a user is traveling in a vehicle with their computing device and, in response, cause a display interface of the computing device to render a selectable assistant graphical user interface (GUI) element. In some implementations, a prediction that the user is traveling can be characterized by a confidence score that is determined by the automated assistant. When the selectable assistant GUI element is selected by the user (e.g., via touch input or spoken utterance), the automated assistant can cause an assistant driving mode GUI to be rendered at the display interface. When the confidence score satisfies a particular confidence threshold, the automated assistant can operate according to a driving mode for processing inputs and/or generating outputs in a manner that is driving-optimized, even though the user may not have selected the selectable assistant GUI element. In some implementations, when the confidence score satisfies the particular confidence score threshold and the user dismisses (e.g., swipes away) the selectable assistant GUI element, the automated assistant can continue to operate according to the driving mode. However, when the confidence score does not satisfy the particular confidence score threshold, the automated assistant may not operate according to the driving mode and/or present the assistant driving mode GUI until the user selects the selectable assistant GUI element.

The assistant driving mode GUI can provide one or more options for assisting the user with their excursion, viewing notifications, and/or otherwise controlling one or more operations of the computing device. For example, the assistant driving mode GUI can provide an indication of a predicted destination of the user, and allow the user to select to have navigation instructions to the predicted destination be provided to the user. Alternatively, or additionally, the assistant driving mode GUI can provide an indication of communication notifications (e.g., incoming messages) and/or predicted media that the user may desire to view during their travels in the vehicle. The assistant driving mode GUI can be rendered to have characteristic(s), such as font size and color, which can be driving-optimized and therefore will mitigate distraction to the user while they are driving. Put another way, the assistant driving mode GUI can include characteristic(s) that vary from a non-driving mode GUI, and those characteristic(s) can be utilized to reduce an amount of cognition needed in interacting with the driving mode GUI.

In some implementations, when a user is determined to be traveling in a vehicle, the automated assistant can proactively adapt various interfaces of the computing device to be driving-optimized—even if the user has not selected the selectable assistant GUI element. For example, when the selectable assistant GUI element is being rendered in response to detecting that the user is driving a vehicle, the automated assistant can also render certain notifications in a driving-optimized format. For instance, a "missed call" notification and/or an "unread text" notification can be rendered at the display interface of the computing device with larger font size and/or in a larger area than would otherwise be used if the user was not predicted to be driving. Alternatively, or additionally, selectable suggestions can also be proactively rendered in a driving-optimized format to provide shortcuts to content and/or applications that the user may be predicted to access under the circumstances. For example, a driving-optimized selectable suggestion can correspond to a podcast that the user prefers to listen to while driving. Even though the user may not have selected the selectable assistant GUI element, the automated assistant can nonetheless render the selectable suggestion in a driving-optimized format.

In some implementations, the user can provide an input to remove the selectable assistant GUI element from the display interface of the computing device while the user is determined or predicted to be traveling in a vehicle. In response, the automated assistant can operate in a light driving-optimized mode in which automated assistant interactions can be driving-optimized, but other features of the computing device may exhibit their original characteristics. For example, in the light driving-optimized mode, a home screen of the computing device may not be rendered in a driving-optimized format and may not include the selectable assistant GUI element. Alternatively, or additionally, in the light driving-optimized mode, the other applications besides the automated assistant can exhibit characteristics that are different from other characteristics exhibited in the driving-optimized mode. However, in the light driving-optimized mode, the automated assistant can provide driving-optimized notifications, responses, and/or other content to the user for mitigating hazards experienced when interacting with a computing device while traveling in a vehicle.

In some implementations, the user can elect to disable the driving-optimized mode and/or light driving-optimized mode when the user is not driving--even if the automated assistant predicts that the user is driving. An indication that the user is not driving, as expressly provided by the user, can be used for further training the automated assistant. For example, one or more indications (e.g., a user accessing a particular application, a calendar event, etc.) used to make a prediction that a user is traveling in a vehicle can be assigned a lower priority, subsequent to the prediction, in response to the user expressly indicating that they are not traveling (e.g., when the user provides an input such as, "Assistant, cancel driving mode" or "Assistant, I'm not driving). Lower priority indications can thereafter influence a confidence score for subsequent predictions related to whether the user is traveling in a vehicle. In this way, the user may not need to repeat inputs for dismissing the driving mode when such indicators arise, thereby reducing a number of user inputs processed by the automated assistant and also preserving computational resources for the automated assistant.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
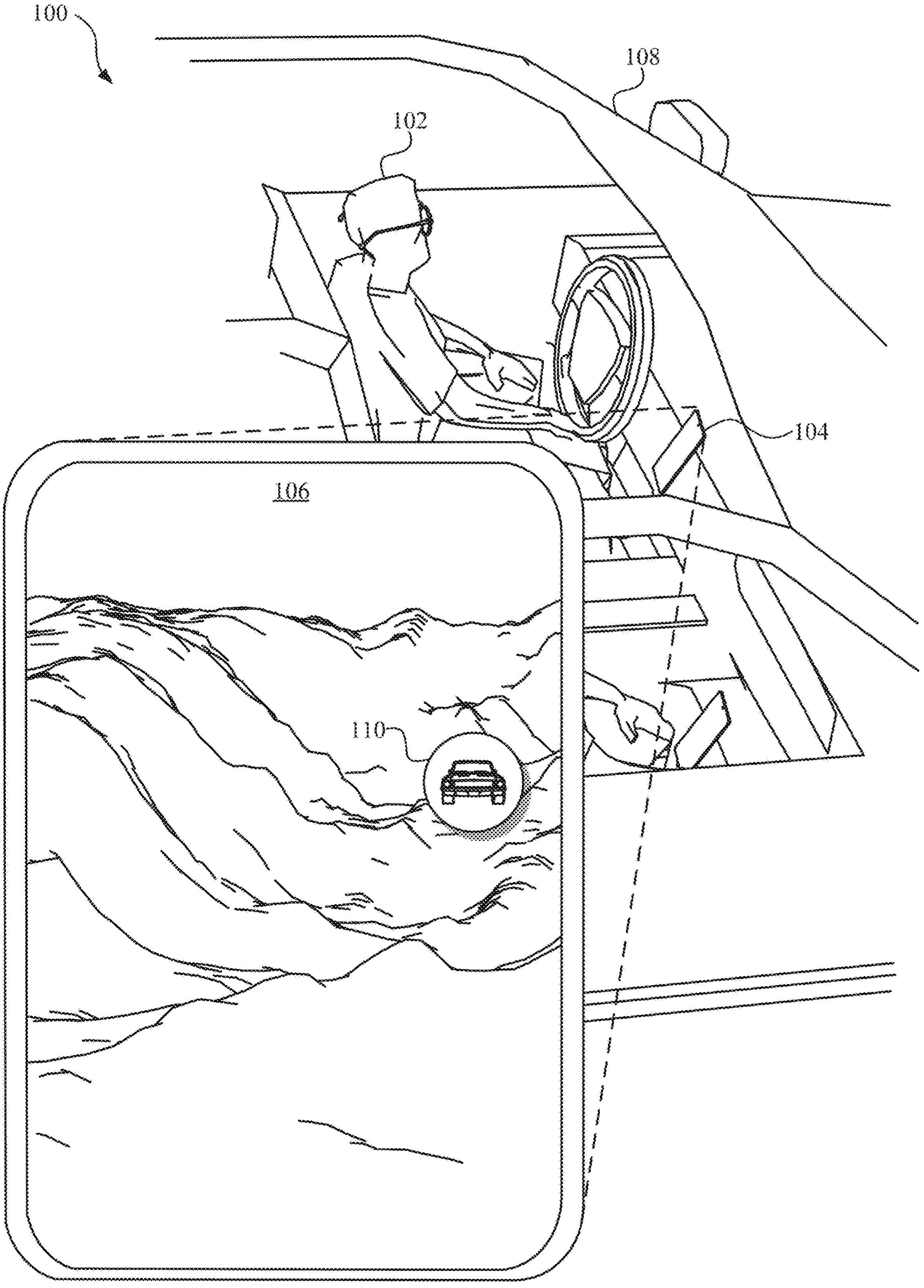
FIG. 1A, FIG. 1B, FIG. 1C, and FIG. 1D illustrates views of a user traveling in a vehicle with their personal computing device that provides access to an automated assistant, which can adapt functionality according to whether the user is predicted to be traveling in a vehicle.

FIG. 1A, FIG. 1B, FIG. 1C, and FIG. 1D illustrates a view 100, a view 120, a view 140, and a view 160 of a user 102 traveling in a vehicle 108 with their personal computing device 104 that provides access to an automated assistant that adapts functionality according to whether the user 102 is predicted to be traveling in a vehicle. For example, the user 102 can enter their vehicle 108 with their computing device 104, which can provide access to an automated assistant. When the computing device 104 is within range of a vehicle computing device of the vehicle 108 for connecting with the vehicle computing device, the automated assistant can predict that the user 102 is traveling in the vehicle 108. For instance, the computing device 104 can connect to the vehicle computing device via a wireless or wired communication protocol. When the automated assistant predicts that the user 102 is, or will be, traveling in the vehicle 108 based on this connection, the automated assistant can cause a selectable assistant GUI element 110 to be rendered at a display interface 106 of the vehicle 108. When the user 102 selects the selectable assistant GUI element 110, the automated assistant can cause an assistant driving mode GUI to be rendered at the display interface of the computing device 104 and/or a display interface of a vehicle computing device. In some implementations, when the automated assistant predicts that the user 102 is, or will be, traveling based on the aforementioned connection and/or a user-initiated accessing of a navigation application, the automated assistant can automatically operate according to an assistant driving mode.

Figure 1B:
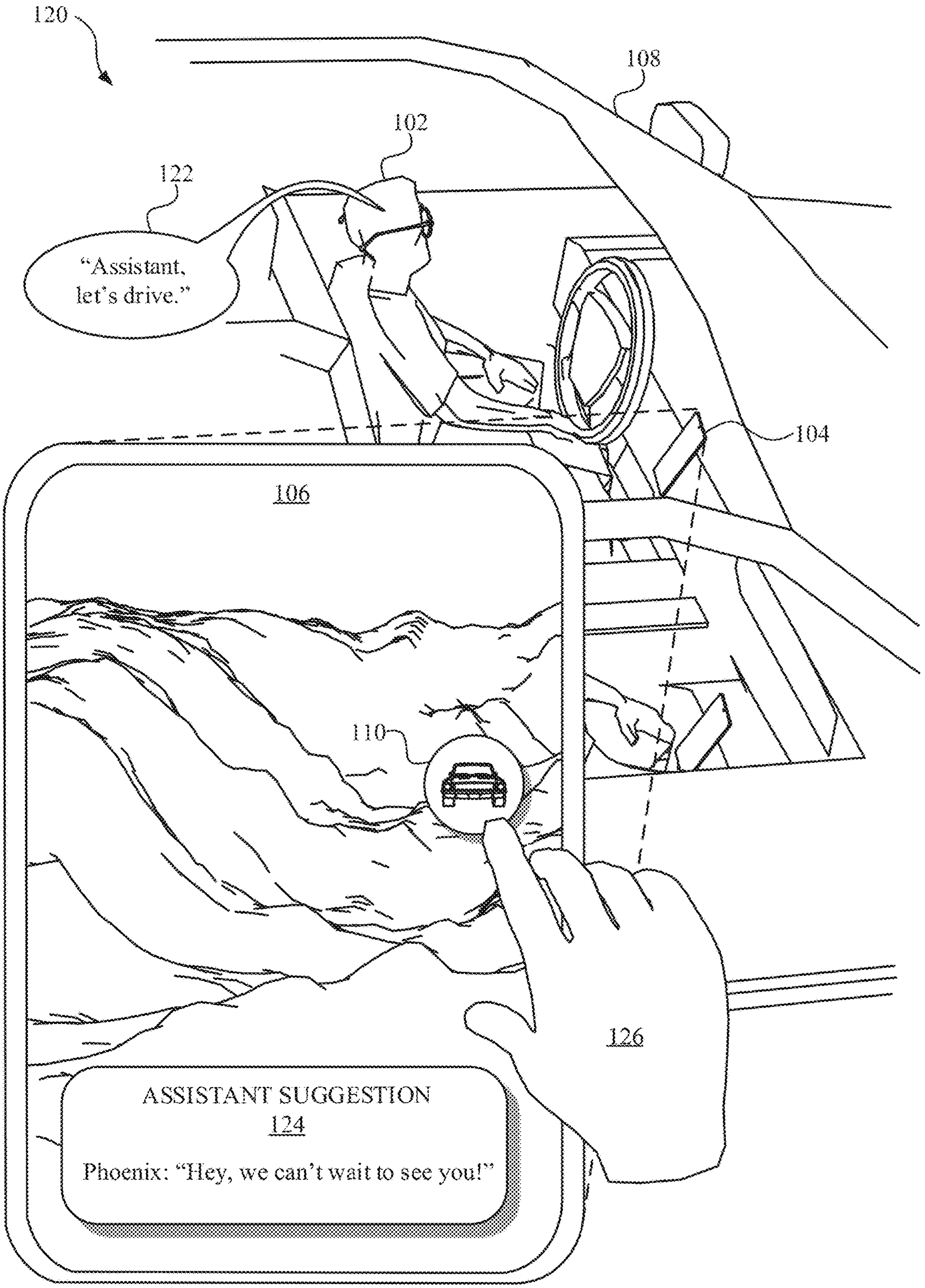

For example, and as illustrated in view 120 of FIG. 1B, the automated assistant and/or one or more other applications of the computing device can operate according to an assistant driving mode prior to the user 102 selecting the selectable assistant GUI element 110. When the automated assistant is operating according to the assistant driving mode, rendering of notifications and/or other operations can be performed in a manner that is optimized for driving. For example, when the user 102 receives an incoming message and the computing device 104 is operating according to the assistant driving mode, the incoming message can be used to generate an assistant suggestion 124. The assistant suggestion 124 can be rendered with one or more characteristics that would be different if the assistant suggestion 124 was being rendered in a non-driving mode. For example, one or more of the characteristics can include a size of the text of the assistant suggestion 124, a style of the text, whether there is a voice characteristic corresponding to the assistant suggestion 124 (e.g., the automated assistant audibly rendering the message notification), an area of the display interface 106 that is occupied by the assistant suggestion 124, and/or any other characteristic that can be associated with an application notification.

In some implementations, a countdown timer can be rendered at the display interface 106 to indicate when the selectable assistant GUI element 110 will be removed from the display interface 106 In some implementations, the countdown timer can be rendered at the display interface 106 to indicate when the assistant driving mode GUI 144 will be rendered at the display interface 106 (assuming the user 102 does not dismiss the selectable assistant GUI element 110 before the expiration of the countdown timer. In some implementations, an action that is performed when a duration of the countdown timer expires can be based on a confidence score for the prediction that the user is traveling. For example, when the confidence score satisfies a confidence score threshold, an expiration of the timer can cause the assistant driving mode GUI 144 to be rendered. However, when the confidence score does not satisfy the confidence score threshold, the expiration of the timer may not result in the assistant driving mode GUI 144 being rendered but the automated assistant may still operate in a driving-optimized mode.

In some implementations, a duration of the countdown timer can be based on a degree of confidence and/or a confidence score that is correlated to the prediction that the user 102 is traveling in a vehicle. For example, the duration can be longer when there is a greater confidence in a prediction that the user 102 is traveling, compared to when there is less confidence in the prediction. In some implementations, the automated assistant may operate according to the assistant driving mode, regardless of whether the user 102 selects the selectable assistant GUI element 110 within the duration of the countdown timer. However, the user 102 may not select the selectable assistant GUI element 110 within the threshold duration of time and therefore not cause the assistant driving mode GUI 144 to be rendered at the display interface 106. In some implementations, the score can be compared to a score threshold for determining whether to automatically operate in the assistant driving mode, or wait for the user 102 to select the selectable assistant GUI element 110 before operating in the assistant driving mode. For example, when the score satisfies the score threshold, the automated assistant and/or computing device 104 can operate according to the assistant driving mode. Otherwise, when the score does not satisfy the score threshold, the automated assistant can cause the selectable assistant GUI element 110 to be rendered at the display interface 106. In some implementations, the score threshold can be set by the user 102, the automated assistant, and/or any other application that can be associated with the automated assistant.

Figure 1C:
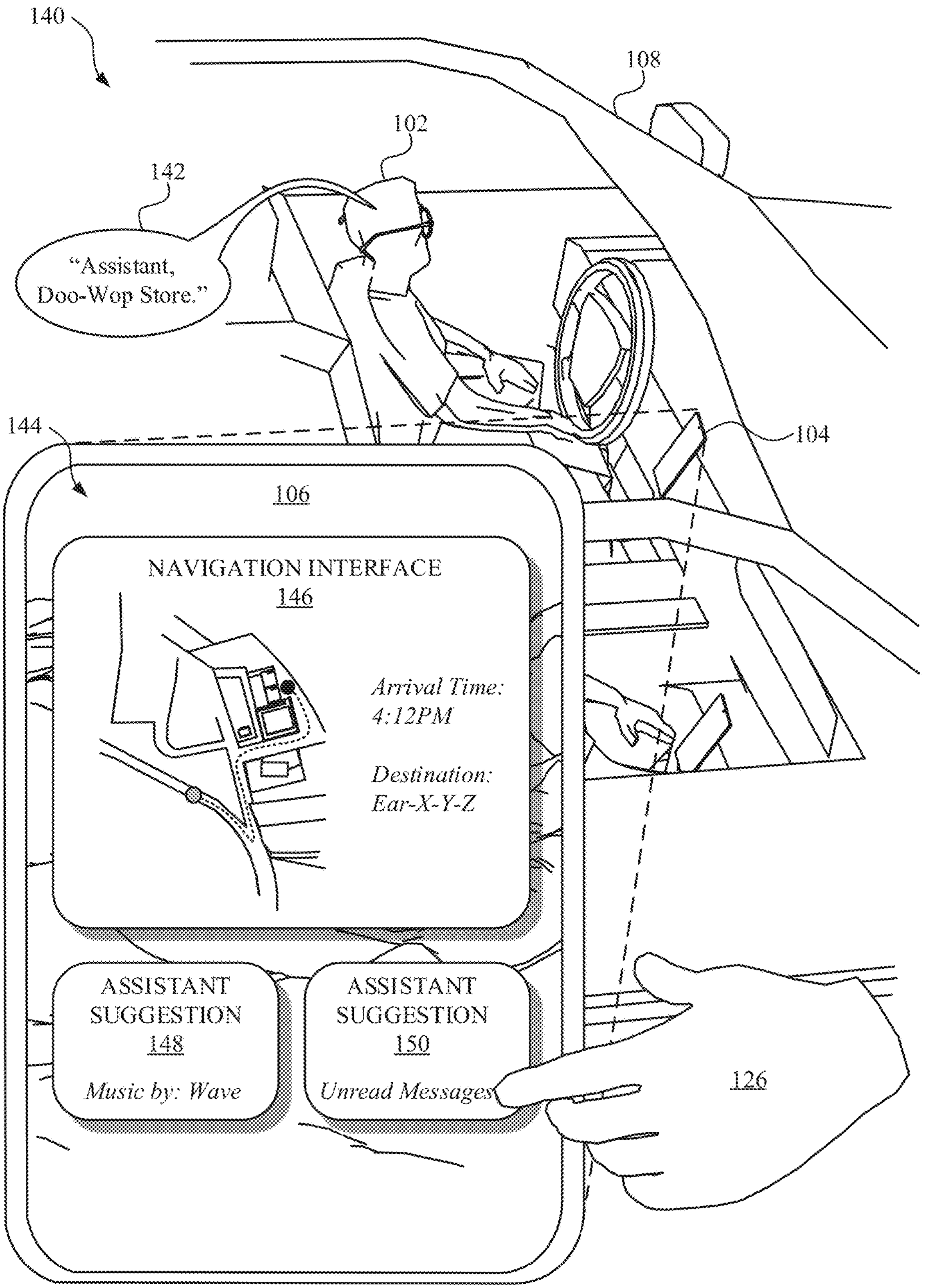

When a selection of the selectable assistant GUI element 110 is received from the user 102 (e.g., with their hand 126 and/or other input) as illustrated in FIG. 1B, the automated assistant can cause an assistant driving mode GUI 144 to be rendered at the display interface 106. One or more characteristics and/or features of the assistant driving mode GUI 144 can be based on data used to predict that the user 102 is traveling in the vehicle 108. For example, when the user 102 is predicted to be traveling based on a connection between the computing device 104 and the vehicle computing device, the assistant driving mode GUI 144 can be rendered with a navigation interface 146 and other suggested content. The other suggested content can be, but is not limited to, an assistant suggestion 148 (e.g., a first selectable element) for opening a media streaming application and/or an assistant suggestion 150 (e.g., a second selectable element) for opening a messaging application. The navigation interface 146 can be rendered with details regarding a route to a destination that the user 102 is predicted to be traveling to. For example, contextual data and/or other data available to the computing device 104 and/or the automated assistant can be processed in order to predict a destination that the user 102 may be traveling to. When a particular destination is identified, and with prior permission from the user 102, a route from a current location of the user 102 to the predicted destination can be available to the user 102 via the navigation interface 146. For example, and as illustrated in FIG. 1C, the user 102 can be predicted to be traveling to "Ear-X-Y-Z" based on contextual data (e.g., a time of day, recent interactions between the user 102 and the automated assistant, vehicle status data communicated to the automated assistant, application data permitted to be accessed by the automated assistant, etc.).

In some implementations, the automated assistant can cause the navigation interface to be rendered with the assistant driving mode GUI 144 without initially causing the selectable assistant GUI element 110 to be rendered at the display interface 106. For example, when a confidence score for a travel prediction satisfies a first score threshold, the automated assistant can cause the selectable assistant GUI element 110 to be rendered at the display interface 106. However, when the confidence score satisfies a second score threshold, the automated assistant can cause assistant driving mode GUI 144 of FIG. 1C to be rendered without initially rendering the selectable assistant GUI element 110. In some implementations, a confidence score that satisfies the second score threshold can be based on a determination that the computing device 104 is connected to a vehicle computing device while a navigation application is being accessed at the computing device 104. Alternatively, the first score threshold can be satisfied when a navigation application is being accessed at the computing device 104 and/or one or more sensors of the computing device 104 indicate (e.g., based on changes in velocity, acceleration, elevation, etc.) that the user 102 is traveling in a vehicle.

When the automated assistant is operating according to the assistant driving mode, inputs to the automated assistant can be processed based on a current context in which the user 102 is traveling in the vehicle 108. For example, when the user 102 is not traveling in the vehicle 108, and is within their home, a spoken utterance 142 to the automated assistant such as, "Assistant, Doo-Wop Store," can be processed as an internet search for websites or a definition. However, when the user 102 is predicted to be traveling in the vehicle 108, the spoken utterance 142 can be processed based on the context of the user 102 traveling in the vehicle 108. For instance, when the user 102 provides the spoken utterance 142, the automated assistant can process the spoken utterance 142 as a request to find directions to a particular destination specified in content of the spoken utterance 142. The results of this processing can be rendered in the assistant driving mode GUI 144, as illustrated in view 160 of FIG. 1D.

In some instances, the user 102 may desire to no longer see the assistant driving mode GUI 144. In order to dismiss the assistant driving mode GUI 144, the user 102 can provide an input to the automated assistant and/or computing device 104 to cause the assistant driving mode GUI 144 to be removed from the display interface 106 (e.g., by swiping the display interface 106 or saying "dismiss."). In response, the automated assistant can cause the display interface 106 to revert from the content displayed at FIG. 1C to the content displayed at FIG. 1A. In other words, in response to the user 102 dismissing the assistant driving mode GUI 144 rendered at FIG. 1C, the automated assistant can replace the assistant driving mode GUI 144 with the selectable assistant GUI element 110, as illustrated in FIG. 1A.

Figure 1D:
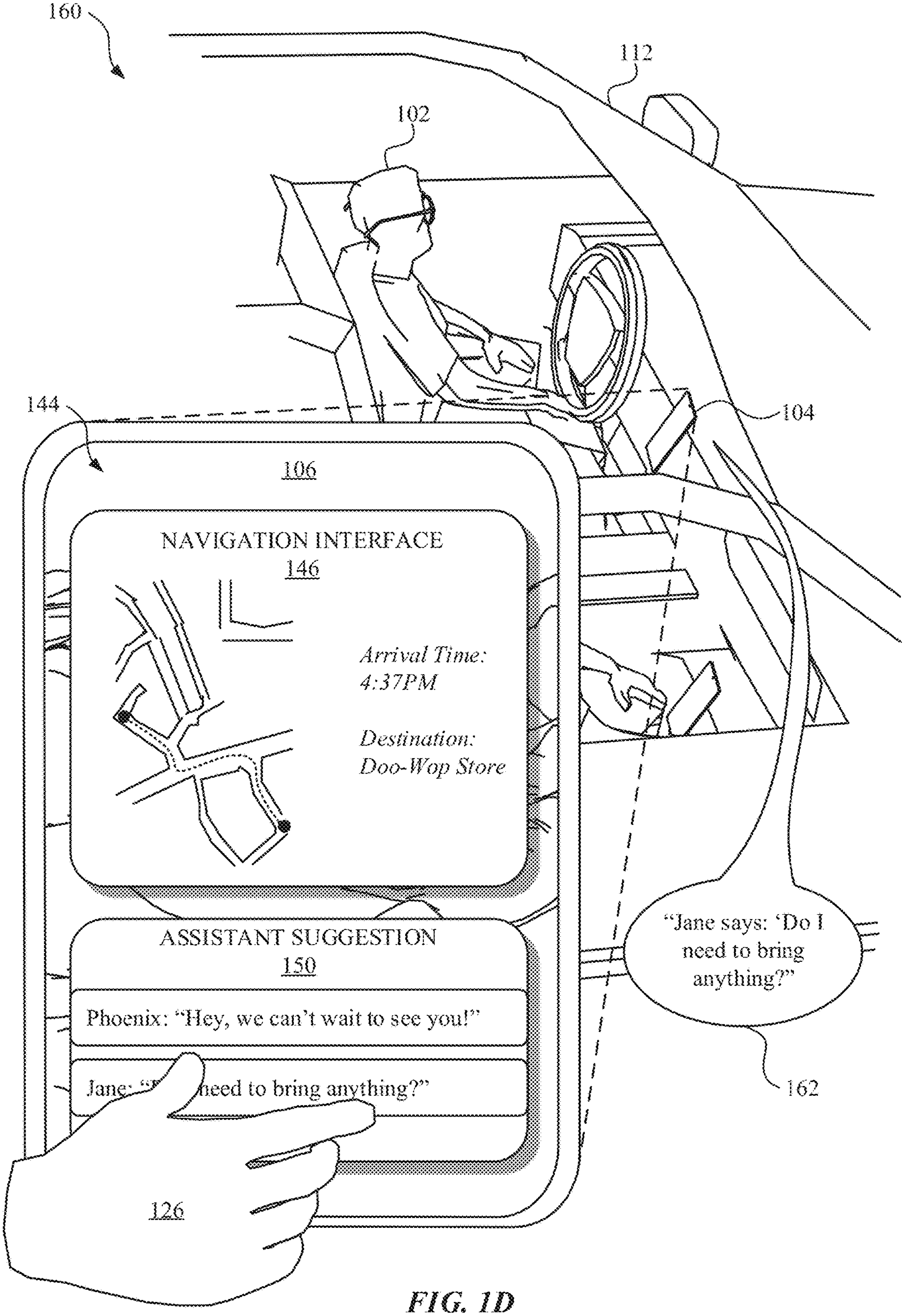

In some implementations, the user 102 can also select the assistant suggestion 150 while the automated assistant is operating according to the assistant driving mode, as illustrated in view 140 of FIG. 1C. In response, an area of the display interface 106 occupied by content of the assistant suggestion 150 can be expanded to a larger area. Alternatively, or additionally, additional content associated with the assistant suggestion 150 can be rendered in response to the user 102 selecting the assistant suggestion 150. For example, and as illustrated in FIG. 1D, the assistant suggestion 150 can be expanded to include content characterizing multiple messages received from multiple other persons. The user 102 can select one of the messages, as illustrated in FIG. 1D, in order to cause the automated assistant to render content of the message in a way that is optimized for safer driving. For example, in response to the user 102 tapping the GUI element corresponding to a message from "Jane," the automated assistant can audibly render an output 162 such as, "Jane says: 'Do I need to bring anything?'", so that the user 102 does not have to read the message from the display interface 106.

Figure 2:
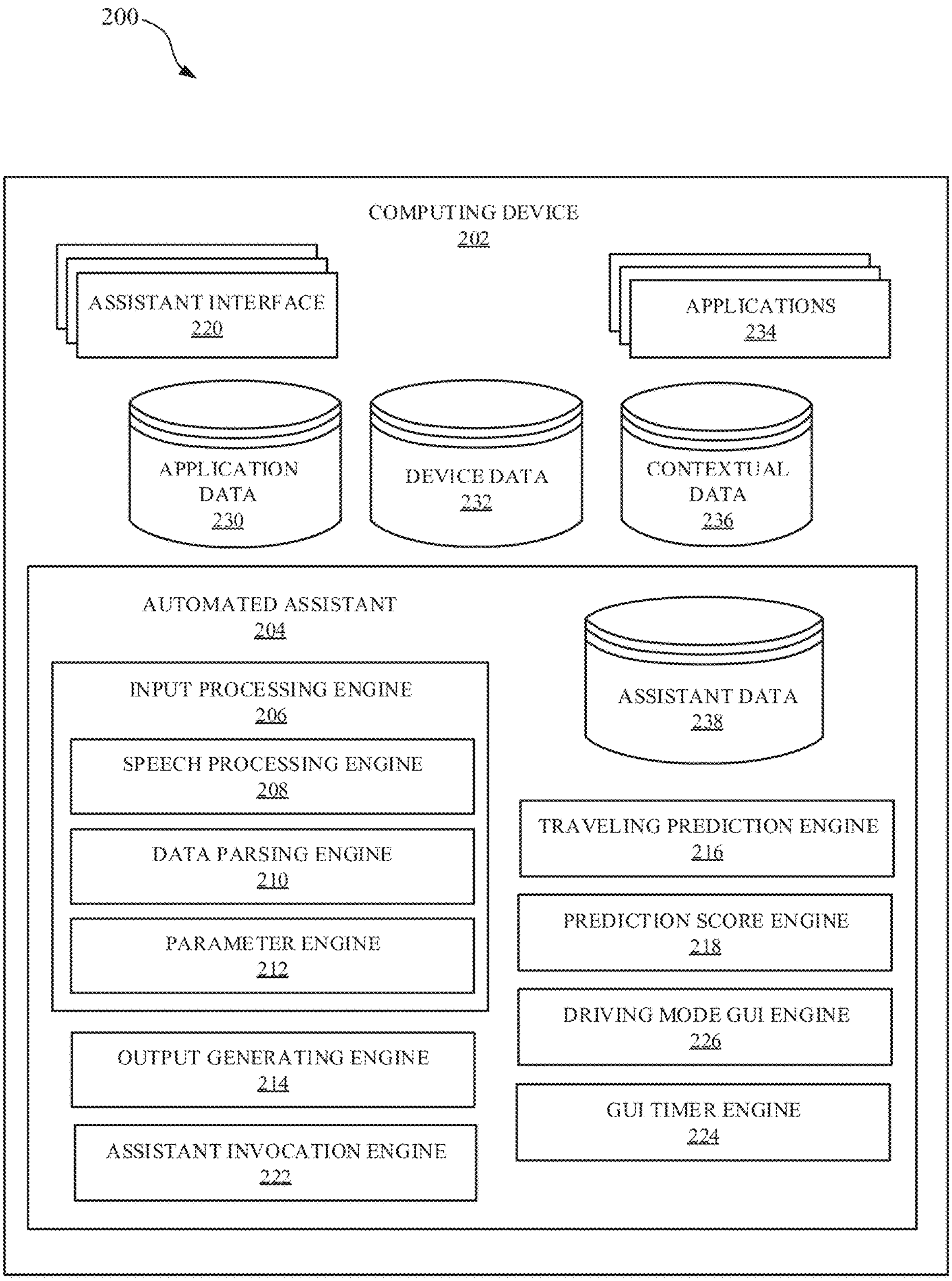
FIG. 2 illustrates a system that provides an automated assistant that facilitates certain driving-optimized functionality according to a degree of confidence that a user is predicted to be traveling in a vehicle.

FIG. 2 illustrates a system 200 that provides an automated assistant that facilitates certain driving-optimized functionality according to a degree of confidence (i.e., a confidence score) that a user is predicted to be traveling in a vehicle. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.).

Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user (with prior permission from the user) that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the Internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment.

In some implementations, the system 200 can include a traveling prediction engine 216 that can generate predictions regarding whether a user is traveling via mode of transportation (e.g., a vehicle). The traveling prediction engine 216 can generate a prediction regarding whether a user is traveling based on application data 230, device data 232, contextual data 236, and/or any other data that is available to the system 200. In some implementations, the traveling prediction engine 216 can generate a prediction based on whether the computing device 202 is in communication with a vehicle computing device (e.g., via Bluetooth or other protocol), whether the user is accessing a navigation application, and/or whether a motion of the user and/or computing device is indicative of vehicle travel. Data characterizing the prediction can be communicated to a prediction score engine 218 of the system 200.

The prediction score engine 218 can generate a score that indicates a confidence for a prediction that a user is traveling via a vehicle. For example, when the score indicates more confidence when the computing device 202 is in communication with a vehicle computing device and when the user is accessing a navigation application. Furthermore, the score can indicate relatively less confidence when the computing device is not in communication with a vehicle computing device but the user is accessing a navigation application. Alternatively, or additionally, the score can indicate relatively less confidence when the prediction is based on a motion of the user and/or data from one or more sensors of the computing device 202.

A driving mode GUI engine 226 can process the score from the prediction score engine 218 to determine whether to operate the computing device 202 and/or the automated assistant 204 in an assistant driving mode. Alternatively, or additionally, the driving mode GUI engine 226 can process the score to determine whether to cause a selectable assistant GUI element to be rendered at an interface of the computing device 202. For example, the score can be compared to a score threshold for automatically initializing an assistant driving mode. When the score threshold is satisfied, the driving mode GUI engine 226 can cause the automated assistant 204 to operate according to an assistant driving mode and also cause the selectable assistant GUI element to be rendered at the display interface of the computing device 202. When the score threshold is not satisfied, the driving mode GUI engine 226 can cause the selectable assistant GUI element to be rendered at the display interface of the computing device 202. Thereafter, the driving mode GUI engine 226 can wait for the user to select the selectable assistant GUI element before causing the automated assistant 204 to operate according to the assistant driving mode.

In some implementations, a GUI timer engine 224 of the system 200 can cause a time to be rendered at the display interface of the computing device 202 to indicate a duration of time that the selectable assistant GUI element will be rendered. When the user chooses to not select the selectable assistant GUI element with the duration of time, the GUI timer engine 224 can indicate to the driving mode GUI engine 226 that the user did not select the selectable assistant GUI element within the duration of time. In response, the driving mode GUI engine 226 can cause the selectable assistant GUI element to be removed from the display interface. In some implementations, the duration of time can be selected by the GUI timer engine 224 based on the score generated by the prediction score engine 218. For instance, a duration of the timer can be longer (e.g., 20 seconds) for scores that indicate more confidence, and the duration can be shorter (e.g., 5 seconds) for scores that indicate less confidence.

Figure 3:
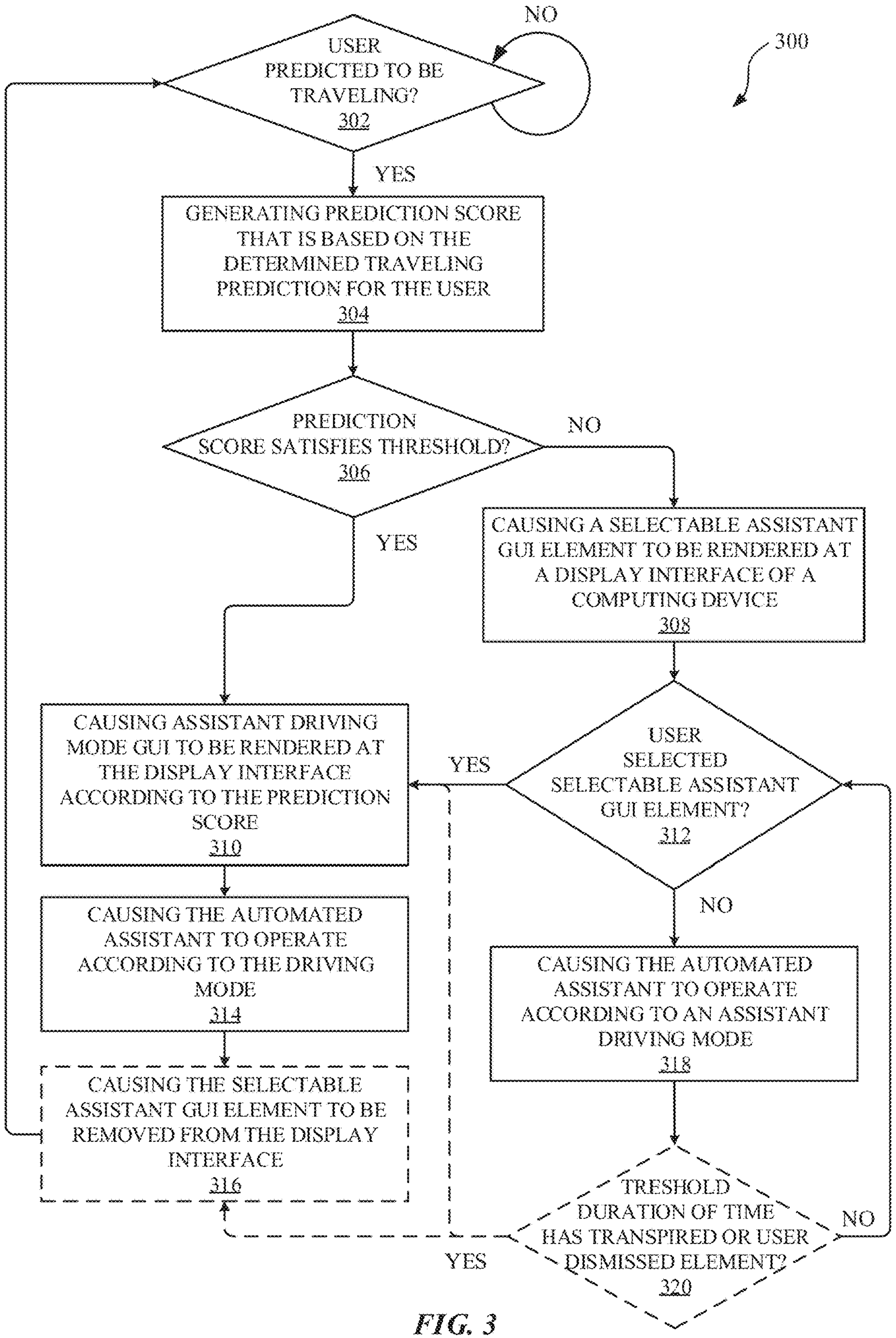
FIG. 3 illustrates a method for proactively operating an automated assistant in an assistant driving-optimized mode, and providing additional driving-optimized features when the user expressly selects to operate in a driving-optimized mode.

FIG. 3 illustrates a method 300 for proactively operating an automated assistant in an assistant driving-optimized mode, and providing additional driving-optimized features when the user expressly selects to operate in a driving-optimized mode. The method 300 can be performed by one or more computing devices, applications, and/or any other apparatus or module that can be associated with an automated assistant. The method 300 can include an operation 302 of determining whether a user is predicted to be traveling along a predicted route. In some implementations, the determination at the operation 302 can be based on one or more sources of data, such as, but not limited to, one or more applications, sensors, and/or devices. For example, a determination that the user is traveling can be based on a computing device (e.g., a cellular phone) connecting via wireless communication protocol to a vehicle computing device and/or the user initializing a navigation application for navigating to a particular destination. In some implementations, the determination at the operation 302 can be based on one or more sensors of the computing device and/or vehicle computing device indicating that the user is traveling in a way that is indicative of the user riding in a vehicle.

When the user is predicted to be traveling, the method 300 can proceed from the operation 302 to an operation 304. Otherwise, the application and/or device executing the method 300 can continue to determine whether the user is predicted to be traveling and/or operate the automated assistant in a non-driving mode. The operation 304 can include generating a prediction score that characterizes a confidence in the prediction that the user is traveling. For example, the confidence score can be higher when the computing device of the user is in communication with a vehicle computing device, compared to when the computing device is not in communication with the vehicle computing device. The method 300 can proceed from the operation 304 to an operation 306 of determining whether the prediction score satisfies a threshold. When the prediction score satisfies the threshold, the method 300 can proceed from the operation 306 to an operation 310. Otherwise, when the prediction threshold is not satisfied, the method 300 can proceed from the operation 306 to an operation 308.

The operation 308 can include causing a selectable assistant GUI element to be rendered at a display interface of a computing device (e.g., a portable computing device that is separate from a vehicle computing device). The selectable assistant GUI element can be, for example, a selectable icon that includes an automobile graphic to indicate that selecting the selectable assistant GUI element will cause the automated assistant to operate in a driving-optimized mode (i.e., an assistant driving mode). In some implementations, the selectable assistant GUI element can be rendered more prominently when a prediction score indicates greater confidence in a prediction that the user is traveling, and less prominently when the prediction score indicates a lower confidence. The method 300 can proceed from the operation 308 to an operation 312.

The operation 312 can include determining whether the user has selected the selectable assistant GUI element. When the user is determined to have not selected the selectable assistant GUI element, the method 300 can proceed from the operation 312 to an operation 318. The operation 318 can include causing the automated assistant to operate according to an assistant driving mode. The assistant driving mode can be a mode in which the automated assistant renders certain outputs and/or processes certain inputs in a manner that is optimized for driving and/or promoting safety. For instance, a notification for an incoming message can be rendered at the display interface with a text size that is larger than another size of font that would be utilized for the notification if the user was not predicted to be traveling. Alternatively, or additionally, the notification for an incoming message can be rendered at the display interface in an area of the display interface that is larger than another area that would be utilized for the notification if the user was not predicted to be traveling.

In some implementations, when the automated assistant operates according to the assistant driving mode, inputs to the automated can be processed using at least local data that characterizes a geographical location of the user. For example, when a user provides an input such as, "Assistant, how much is gas?", while the automated assistant is operating in the assistant driving mode, the input can be processed using data corresponding to a location of the user. For instance, the automated assistant can generate a responsive output such as, "Gas is $2.35 per gallon at the Station that is 0.25 miles from your location," using data that relates to the current location of the user. However, when the user provides this input when the automated assistant is not operating in the assistant driving mode, the automated assistant can provide another responsive output such as, "Crude oil is $70 per barrel today." This other responsive output can be based on one or more sources of data that may not include or prioritize local data.

In some implementations, the operation 318 can be bypassed when the prediction score does not satisfy another prediction threshold for bypassing initiating the assistant driving mode. In this way, when the other prediction threshold is not satisfied, the automated assistant may optionally wait for the user to select the selectable assistant GUI element before operating according to the assistant driving mode. The method 300 can proceed from the operation 318 to an optional operation 320 of determining whether the user selected the selectable assistant GUI element before a threshold duration of time has transpired, and/or whether the user dismissed the selectable assistant GUI element. In some implementations, the threshold duration of time can be based on the score for the prediction that the user is traveling in a vehicle. The score can indicate a confidence for the prediction that the user is traveling in a vehicle and/or driving a vehicle. For example, the threshold duration of time can be longer for a higher confidence score and shorter for a lower confidence score. This can allow the user more time to activate the assistant driving mode via the selectable assistant GUI element when the user is more likely predicted to be traveling in a vehicle. When the threshold duration of time has transpired without the user selecting the selectable assistant GUI element, the method 300 can optionally proceed from the operation 320 to an operation 310, or optionally proceed from the operation 320 to an operation 316. Otherwise, when the user selects the selectable assistant GUI element at the operation 312, the method 300 can proceed to the operation 310.

The operation 310 can include causing an assistant driving mode GUI to be rendered at the display interface based on the score for the prediction that the user is traveling. For example, when the score satisfies the threshold score, the assistant driving mode GUI can be rendered with a first portion that includes a navigation interface and a second portion that includes one or more selectable suggestions. Alternatively, or additionally, when the score does not satisfy the threshold score, the assistant driving mode GUI can be initially rendered with either the navigation interface or the one or more selectable suggestions. In some instances, the score can satisfy the threshold score when an antenna or sensor of the computing device is in communication with a vehicle computing device via a wireless communication protocol. Alternatively, or additionally, the score can satisfy the threshold score when the computing device is in communication with the vehicle computing device and the user is accessing a navigation application via the computing device and/or the vehicle computing device. In some instances, the score may not satisfy the threshold score when the computing device is not in communication with the vehicle computing device but the user is accessing a navigation application via the computing device.

In some implementations, the method 300 can proceed from the operation 310 to an operation 314, which can include causing the automated assistant to operate according to the assistant driving mode. Characteristics of the automated assistant and/or content rendered by the computing device can be adjusted according to the score for the prediction that the user is traveling in a vehicle. The method 300 can proceed from the operation 314 to an optional operation 316, which can include causing the selectable assistant GUI element to be removed from the display interface. Thereafter, the method 300 can proceed from the operation 314, or operation 316, to the operation 302 for determining whether the user is predicted to be traveling in a vehicle. When the user is predicted to no longer be traveling in a vehicle (e.g., car, truck, airplane, bicycle, motocycle, boat, and/or any other mode of transportation), the automated assistant can cease operating according to the assistant driving mode. Alternatively, the method 300 can proceed from the operation 314, or the operation 316, to the operation 308 when the user dismisses or swipes away the assistant driving mode GUI. In this way, by dismissing the assistant driving mode GUI and causing the selectable assistant GUI element to be rendered again, the user has a "shortcut" to access the assistant driving mode GUI again during their travels.

Figure 4:
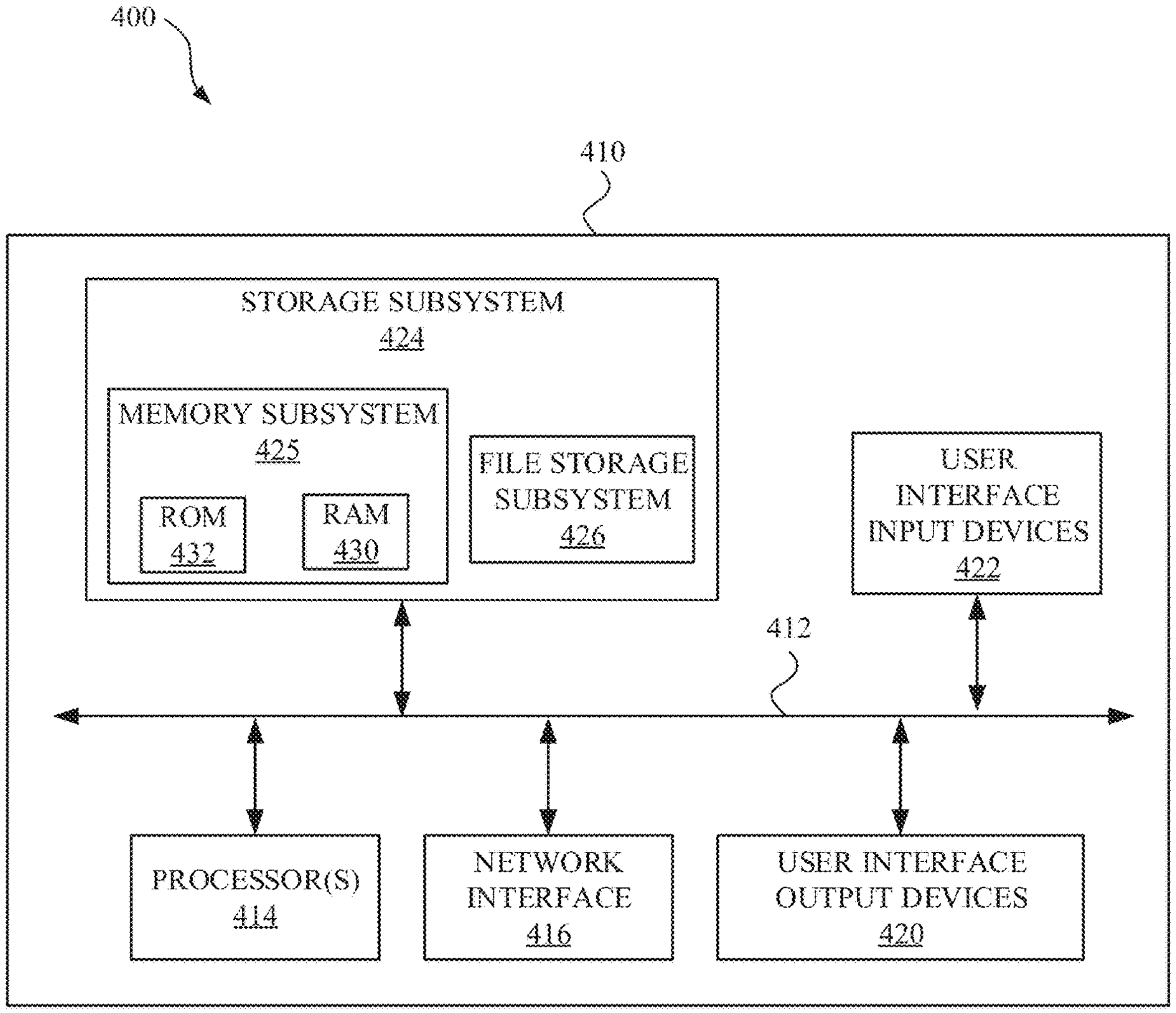
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term “input device” is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term “output device” is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, vehicle computing device, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, “participants”), or may make use of personal information, the users may be provided with an opportunity to control whether programs or features collect user information (e.g., information about a user’s social network, social actions or activities, profession, a user’s preferences, or a user’s current geographic location), or to control whether and/or how to receive content from the content server that may be more relevant to the user. Also, certain data may be treated in one or more ways before it is stored or used, so that personal identifiable information is removed. For example, a user’s identity may be treated so that no personal identifiable information can be determined for the user, or a user’s geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, at a computing device, a prediction that a user of the computing device is traveling in a vehicle, wherein the computing device provides access to an automated assistant and is separate from a vehicle computing device of the vehicle. In some implementations, the method can further include, when the prediction that the user is traveling in the vehicle is based on: user-initiated accessing of a navigation interface via the computing device or the vehicle computing device, and the computing device being in communication with the vehicle computing device: causing an assistant driving mode graphical user interface (GUI) to be automatically rendered at a display interface of the computing device, wherein the assistant driving mode GUI includes the navigation interface and content predicted to be accessed by the user while the user is traveling in the vehicle. In some implementations, the method can further include, when the prediction that the user is traveling in the vehicle is based on the computing device being in communication with the vehicle computing device while the navigation interface is not being accessed via the computing device: causing a selectable assistant GUI element to be rendered at the display interface of the computing device, wherein a selection of the selectable assistant GUI element causes the navigation interface to be rendered at the display interface of the computing device.

In some implementations, the method can further include, when the user is predicted to be traveling in the vehicle based on one or more sensors of the computing device indicating that the user is traveling in the vehicle while the computing device is not in communication with the vehicle computing device: causing the automated assistant to operate in an assistant driving mode in which particular user inputs to the automated assistant are processed using local data that characterizes a geographical location of the user or a predicted route of the vehicle. In some implementations, causing the selectable assistant GUI element to be rendered at the display interface of the computing device includes: causing a countdown timer to be rendered and initialized via the computing device, wherein the selectable assistant GUI element is removed from the display interface in response to the user not selecting the selectable assistant GUI element before an expiration of the countdown timer. In some implementations, wherein causing the selectable assistant GUI element to be rendered at the display interface of the computing device includes: causing a countdown timer to be rendered and initialized via the computing device, wherein, when the user does not select the selectable assistant GUI element before an expiration of the countdown timer, the automated assistant operates according to an assistant driving mode in which particular user inputs to the automated assistant are processed using local data that characterizes a geographical location of the user or a predicted route of the vehicle. In some implementations, the content of the assistant driving mode GUI includes a first selectable element corresponding to a messaging application and a second selectable element corresponding to a media streaming application.

In other implementations, a method implemented by one or more processors is set forth as including operations such as determining, at a computing device, a score for a prediction that a user is traveling in a vehicle, wherein the computing device provides access to an automated assistant and is separate from a vehicle computing device of the vehicle. In some implementations, the method can further include, when the score for the prediction satisfies a score threshold: causing an assistant driving mode graphical user interface (GUI) to be automatically rendered at a display interface of the computing device, wherein the assistant driving mode GUI includes a navigation interface and content predicted to be accessed by the user while the user is traveling in the vehicle. In some implementations, the method can further include, when the score for the prediction does not satisfy the score threshold: causing a selectable assistant GUI element to be rendered at the display interface of the computing device, wherein a selection of the selectable assistant GUI element causes the automated assistant to operate according to an assistant driving mode in which the navigation interface is rendered at the display interface.

In some implementations, the selectable assistant GUI element to be rendered at the display interface includes: causing the selectable assistant GUI element to be rendered over a home screen or a lock screen that is being rendered at the display interface of the computing device. In some implementations, determining the score for the prediction that the user is traveling in the vehicle includes: generating the score for the prediction based on the data generated using one or more sensors of the computing device or other data available at another computing device that is associated with the user. In some implementations, the method can further include, when the assistant driving mode GUI is rendered at the display interface, the navigation interface is rendered in a larger area of the display interface when the score satisfies the score threshold compared to when the navigation interface is rendered and the score does not satisfy the score threshold.

In some implementations, the method can further include, when the assistant driving mode GUI is rendered at the display interface, textual content of the assistant driving mode GUI is rendered larger when the score satisfies the score threshold compared to when the textual content is rendered and the score does not satisfy the score threshold. In some implementations, the method can further include, when the score for the prediction does not satisfy the score threshold, causing the selectable assistant GUI element to be rendered at the display interface of the computing device includes: causing the display interface or other interface of the computing device to render an indication that the selectable assistant GUI element will be removed from the display interface after a threshold duration of time, wherein the threshold duration of time is based on the score for the prediction that the user is traveling in the vehicle. In some implementations, the score for the prediction is based on whether a network antenna of the computing device is facilitating wireless communication between the computing device and the vehicle computing device.

In yet other implementations, a method implemented by one or more processors is set forth as including operations such as determining, at a computing device and based on data generated using one or more sensors of the computing device, a prediction that a user is traveling in a vehicle, wherein the computing device provides access to an automated assistant and is separate from a vehicle computing device of the vehicle. The method can further include causing, based on determining that the user is predicted to be traveling in the vehicle, a selectable assistant graphical user interface (GUI) element to be rendered at a display interface of the computing device. The method can further include, when a selection of the selectable assistant GUI element is received for activating a driving mode for the automated assistant: causing, in response to receiving the selection of the selectable assistant GUI element, an assistant driving mode GUI to be rendered at the display interface of the computing device, wherein characteristics of one or more selectable GUI elements rendered at the assistant driving mode GUI are selected based on a score for the prediction that the user is traveling in the vehicle.

In some implementations, causing the selectable assistant GUI element to be rendered at the display interface includes: causing the selectable assistant GUI element to be rendered over a home screen or a lock screen that is being rendered at the display interface of the computing device. In some implementations, determining the prediction that the user is traveling in the vehicle includes: generating the score for the prediction based on whether the user is accessing a navigation application and whether the computing device is in communication with the vehicle computing device. In some implementations, causing the assistant driving mode GUI to be rendered at the display interface includes: determining whether the score satisfies a score threshold for selecting an area of the display interface that will be occupied by the assistant driving mode GUI, wherein the area is larger when the score satisfies the score threshold compared to when the score does not satisfy the score threshold.

In some implementations, causing the assistant driving mode GUI to be rendered at the display interface includes: determining whether the score satisfies a score threshold for selecting a text size for text that corresponds to the assistant driving mode GUI, wherein the text size is larger when the score satisfies the score threshold compared to when the score does not satisfy the score threshold. In some implementations, the method can further include causing, based on determining the prediction that the user is traveling in the vehicle, the automated assistant to operate according to an assistant driving mode, wherein, when the automated assistant operates according to the assistant driving mode, particular user inputs to the automated assistant are processed using local data that characterizes a geographical location of the user or a predicted route of the user. In some implementations, the method can further include, when the selection of the selectable assistant GUI element is not received for activating the driving mode for the automated assistant: causing the display interface or other interface of the computing device to render an indication that the selectable assistant GUI element will be removed from the display interface after a threshold duration of time, wherein the threshold duration of time is based on the score for the prediction that the user is traveling in the vehicle. In some implementations, determining the prediction that the user is traveling in the vehicle includes: generating the score for the prediction based on whether the computing device has received vehicle status data from the vehicle indicating that the user is traveling in the vehicle.

We claim:

1. A method implemented by one or more processors, the method comprising:

determining, at a computing device, a prediction that a user of the computing device is traveling in a vehicle, wherein the computing device provides access to an automated assistant and is separate from a vehicle computing device of the vehicle, and wherein the prediction is based on (a) the computing device being in communication with the vehicle computing device while a navigation interface is not being accessed via the computing device;

in response to determining the prediction that the user is traveling in the vehicle based on (a) the computing device being in communication with the vehicle computing device while the navigation interface is not being accessed via the computing device:

causing a selectable assistant GUI element to be rendered at a display interface of the computing device, wherein a selection of the selectable assistant GUI element causes the navigation interface to be rendered at the display interface of the computing device;

determining, at the computing device, an additional prediction that the user of the computing device is traveling in the vehicle, wherein the additional prediction is based on (b) user-initiated accessing of the navigation interface via the computing device or the vehicle computing device, and the computing device being in communication with the vehicle computing device; and in response to determining the additional prediction that the user is traveling in the vehicle based on (b) user-initiated accessing of the navigation interface via the computing device or the vehicle computing device, and the computing device being in communication with the vehicle computing device:

causing an assistant driving mode graphical user interface (GUI) to be automatically rendered at the display interface of the computing device without rendering the selectable assistant GUI element, wherein the assistant driving mode GUI, automatically rendered at the display interface, includes the navigation interface and content predicted to be accessed by the user while the user is traveling in the vehicle.

2. The method of claim 1, wherein causing the selectable assistant GUI element to be rendered at the display interface of the computing device includes:

causing a countdown timer to be rendered and initialized via the computing device, wherein the selectable assistant GUI element is removed from the display interface in response to the user not selecting the selectable assistant GUI element before an expiration of the countdown timer.

3. The method of claim 1, wherein causing the selectable assistant GUI element to be rendered at the display interface of the computing device includes:

causing a countdown timer to be rendered and initialized via the computing device, wherein, when the user does not select the selectable assistant GUI element before an expiration of the countdown timer, the automated assistant operates according to an assistant driving mode in which particular user inputs to the automated assistant are processed using local data that characterizes a geographical location of the user or a predicted route of the vehicle.

4. The method of claim 1, wherein the content of the assistant driving mode GUI includes a first selectable element corresponding to a messaging application and a second selectable element corresponding to a media streaming application.

5. A system comprising:

one or more computers and one or more storage devices storing instructions that are operable, when executed by the one or more computers, to cause the one or more computers to perform operations comprising:

determining, at a computing device, a prediction that a user of the computing device is traveling in a vehicle, wherein the computing device provides access to an automated assistant and is separate from a vehicle computing device of the vehicle, and wherein the prediction is based on the computing device being in communication with the vehicle computing device while a navigation interface is not being accessed via the computing device, or the prediction is based on user-initiated accessing of the navigation interface via the computing device or the vehicle computing device, and the computing device being in communication with the vehicle computing device;

when the prediction that the user is traveling in the vehicle is based on the computing device being in communication with the vehicle computing device while the navigation interface is not being accessed via the computing device:

causing a selectable assistant GUI element to be rendered at a display interface of the computing device, wherein a selection of the selectable assistant GUI element causes the navigation interface to be rendered at the display interface of the computing device; and when the prediction that the user is traveling in the vehicle is based on user-initiated accessing of the navigation interface via the computing device or the vehicle computing device, and the computing device being in communication with the vehicle computing device:

causing an assistant driving mode graphical user interface (GUI) to be automatically rendered at the display interface of the computing device without rendering the selectable assistant GUI element, wherein the assistant driving mode GUI, automatically rendered at the display interface, includes the navigation interface and content predicted to be accessed by the user while the user is traveling in the vehicle.

6. The system of claim 5, wherein the operations further comprise:

when the user is predicted to be traveling in the vehicle based on one or more sensors of the computing device indicating that the user is traveling in the vehicle while the computing device is not in communication with the vehicle computing device:

causing the automated assistant to operate in an assistant driving mode in which particular user inputs to the automated assistant are processed using local data that characterizes a geographical location of the user or a predicted route of the vehicle.

7. The system of claim 5, wherein causing the selectable assistant GUI element to be rendered at the display interface of the computing device includes:

causing a countdown timer to be rendered and initialized via the computing device, wherein the selectable assistant GUI element is removed from the display interface in response to the user not selecting the selectable assistant GUI element before an expiration of the countdown timer.

8. The system of claim 5, wherein causing the selectable assistant GUI element to be rendered at the display interface of the computing device includes:

causing a countdown timer to be rendered and initialized via the computing device, wherein, when the user does not select the selectable assistant GUI element before an expiration of the countdown timer, the automated assistant operates according to an assistant driving mode in which particular user inputs to the automated assistant are processed using local data that characterizes a geographical location of the user or a predicted route of the vehicle.

9. The system of claim 5, wherein the content of the assistant driving mode GUI includes a first selectable element corresponding to a messaging application and a second selectable element corresponding to a media streaming application.

* * * * *